Feb. 11, 1969    R. C. STRAUSS    3,426,615
VEHICLE DRIVING CONTROLS
Filed May 29, 1967

INVENTOR.
Raymond C. Strauss

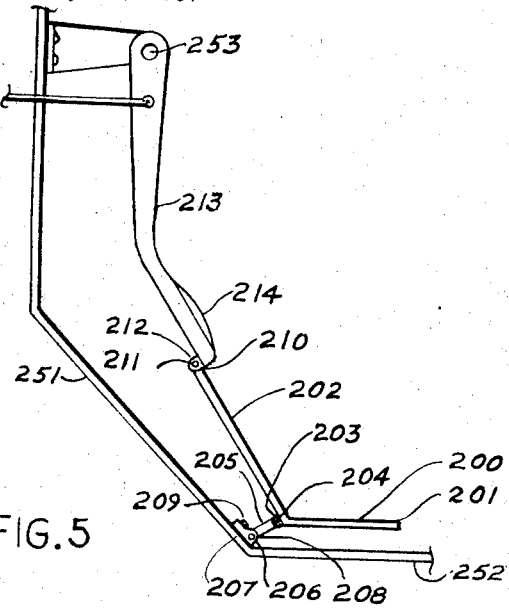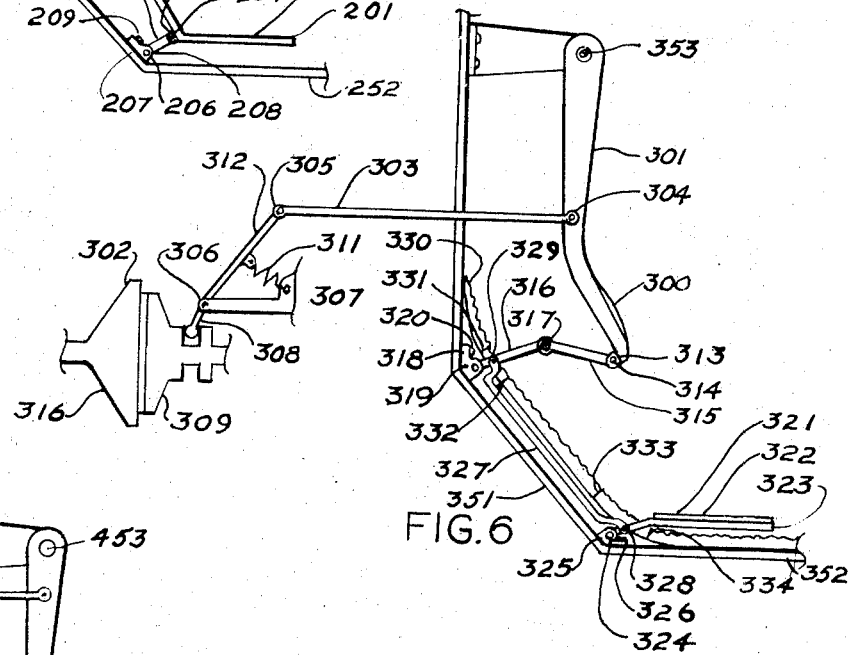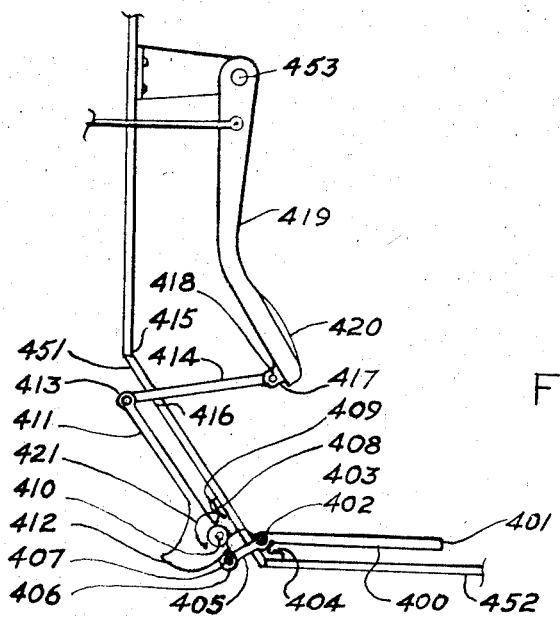

United States Patent Office 3,426,615
Patented Feb. 11, 1969

3,426,615
VEHICLE DRIVING CONTROLS
Raymond C. Strauss, 301 W. Lenawee St.,
Lansing, Mich. 48933
Filed May 29, 1967, Ser. No. 642,110
U.S. Cl. 74—513                                     6 Claims
Int. Cl. G05g 1/14, 1/18; B62d 25/20

ABSTRACT OF THE DISCLOSURE

Pedal controls for a vehicle which include pendulum suspended pedals adapted for engagement with the toe portion of the vehicle operator's foot. In one embodiment the toe portions extend diagonally so that the toe of the foot can be shifted laterally to obtain different leverage. Heelrests are provided for the operator's foot which are independently pivotally supported to the vehicle floor board and which are connected to the pedal. Downward movement of the pedal causes movement of the heelrest at a rate to maintain the heel portion of the operator's foot at its initial contact location during movement of the pedal. In a further embodiment, the heelrests are connected to a secondary throttle shutter in the engine carburetor.

---

The present invention relates to a rotatable form of heelrest for the operator of a vehicle for use with a pendulum suspended pedal control, such as a brake, accelerator, clutch, or the like, as disclosed in my copending application Ser. No. 323,187, filed Sept. 30, 1963, Patent No. 3,354,743.

One object of this invention is to provide a heelrest which is pivoted at its forward end toward the front end of the vehicle on the floorboard and engages the pedal to support by counterbalancing force the pedal in a released position when the ball of an operator's foot rests on the pedal and his heel rests on the heelrest.

Another object of this invention is to provide a rotatable heelrest responsive to the applying and releasing movement of a pendulum suspended pedal so that the heel of the foot moves in an arcuate path to permit the ball of the foot to remain undisturbed in its initial contact with the pedal substantially throughout the pedal's applying and releasing movements.

Another object of this invention is to provide a heelrest behind its pivoting mounting substantially parallel, when in its released position, to the horizontal section of the vehicle's floorboard, so that the operator's heel may seek forwardly or backwardly a position for maximum comfort to the ankle.

Another object of this invention is to provide in combination with a rotatable heelrest an upwardly arching ridge on the pedal surface somewhat diagonal to the pendulum suspending pivot points for the pedal so that the ball of the operator's foot may seek left or right to obtain the leverage most satisfactory to the size of the foot in operating the pedal.

Another object of this invention is to provide a rotatable heelrest which in being responsive to pedal application operates to cut off the source of accelerating power for the motor of the vehicle.

Further objects and features will become apparent from the following description and consideration of the accompanying drawings.

In the drawings where like characters refer to like parts throughout the several views:

FIGURE 5 is a side elevation of another form of the cooperating pedal and heelrest, the heelrest being mounted indirectly upon the floorboard through a link therebetween.

FIGURE 6 is a side elevation of another form of the cooperating pedal and heelrest wherein a joining link operates adjacent the inclined portion of the floorboard at or below carpet level, to operate a clutch.

FIGURE 7 is a side elevation of yet another form of the cooperating pedal and heelrest with an upwardly extending portion of the heelrest operating under the inclined portion of the floorboard, by means of a cam.

One practice in present day automotive manufacturing is to suspend foot control pedals downwardly from their pivoting points on a vehicle for contact by the foot at the lower pedal ends. This encourages an operator to locate his operating heel for a pedal on the horizontal surface of the driving compartment floorboard. As a result, when a pedal is applied by the ball of the operator's foot, the heel is dragged forwardly along the floorboard. When the pedal is released, the heel jams against the floorboard unless it is lifted for relocation rearwardly.

Furthermore, the operator usually finds it convenient to rest the ball of the foot against the pedal in anticipation of use, either causing the muscles to tense in holding the foot back, or allowing foot weight to partially apply the pedal or vibrate the pedal through vehicle motion, thereby causing the master cylinder brake plunger to load up the brake lines with fluid pressure to drag the brakes, the accelerator pump to supply and waste extra gas, or the throwout bearing of the clutch to become prematurely worn.

Figure 1:
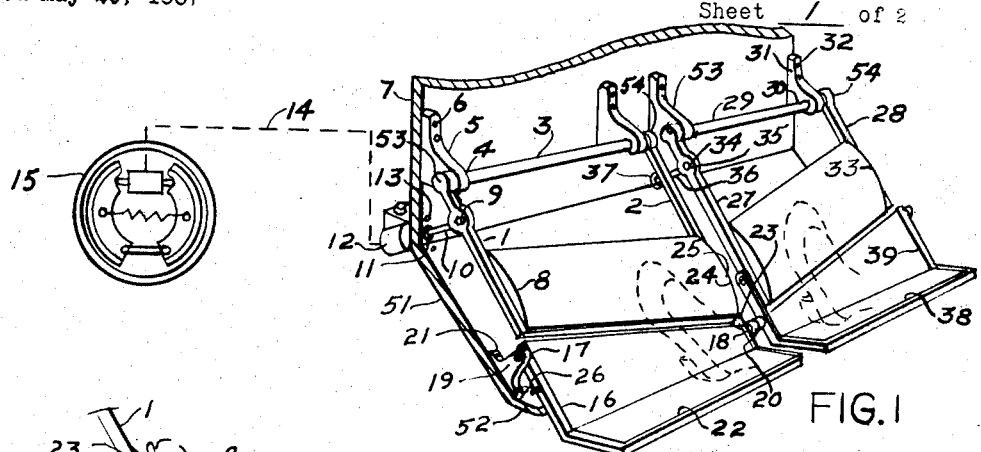
FIGURE 1 is a perspective view of a pair of pendulum suspended, diagonally, and oppositely slanted pedals with cooperating heelrests, the operator's positioned feet thereon being shown in broken lines.

To overcome these faults and permit the driver of a vehicle the convenience of "riding" the pedals in safety, there is shown in FIGURE 1 one type of a brake pedal pendulum suspended from arms 1 and 2, and a similar accelerator pedal suspended from arms 27 and 28 in a section of the driver compartment of a vehicle.

Referring now to the brake pedal, here short arm 1 and long arm 2 operate from their point of fulcrum, shaft 3 which rides in bearing openings 4 of brackets 5 which are attached through bolts 6 to the firewall 7 of the vehicle. A curved top platform 8 is welded to the downwardly depending arms so that it is diagonally pitched therebetween. Intermediate of the length of the arm 1 there is formed an elongated eye opening 9 for flexible connection with a master cylinder pushrod 10. The pushrod passes through opening 11 of floorboard section 51 for operation of a power boosted or manual type master cylinder such as 12. Cylinder 12 attaches to firewall 7 through bolts 13, the master cylinder being connected to a representative vehicle wheel brake 15 by line 14.

Treadle heelrest 16 rides at diagonally located pivot points 17 and 18 on stanchions 19 and 20 secured to floorboard section 51 by bolts 21. Treadle heelrest 16 is shown to carry laterally extending heelrest shelf 22 for maximum comfort of the foot. A section of the heelrest projects upwardly above inboard stanchion 20 to terminate in arm 23 welded thereto. The arm, in turn, ends in eye opening 24 in which rides pin 25 attached to depending arm 2 so that with clockwise pressure of the relaxed weight of the operator's foot and the tension of spring 26 between stanchion 19 and treadle heelrest 16 the platform 8 is urged toward its released position to support the relaxed weight of the upper portion of the operator's foot bringing pushrod 10 to the lower end of opening 9.

In the initial downward movement of platform 8 the elongated eye 9 moves downwardly to engage the upper end of pushrod 10 and in so doing actuates an electric switch or valve control (not shown, but similar to the types shown in my Patent 2,912,810, filed Mar. 26, 1951 and issued Nov. 10, 1959) to operate one of my accelerator disconnect units. Continued downward movement then starts to move the master cylinder plunger into master cylinder housing 12 for brake setting. With the downward movement of platform 8 the heelrest 16 rotates diagonally thereto in a counter clockwise direction and pin 25 attached to arm 2 slides endwardly and partially out of elongated eye 24 while traversing lengthwardly the elongated cut thereof.

Inasmuch as platform 8 is pendulum suspended, a long foot in falling upon 8 projects upwardly closer to the point of fulcrum 53, namely shaft 3, than a short foot, and therefore the long foot has less leverage upon platform 8 than the short foot, with the result that the length of the foot automatically adjusts the pressuring force to the brake shaft 10 so that substantially uniform braking pressure is developed by different drivers and tendencies for overbraking are minimized.

As with the brake pedal, use of the heel supporting arrangement may be applied to the accelerator. Pendulum arms for an accelerator, namely, 27 and 28, are welded to pivoting shaft 29 which rotates in bearing openings 30 of brackets 31 attached through bolts 32 to the firewall 7 of the vehicle. A curved accelerator top platform 33, pitched diagonally in a direction opposite to that of platform 8, is welded to the depending arms 27 and 28. Depending arm 27 is apertured at 34 to receive bolt 35 connecting to accelerator rod 36 which passes through the firewall 7 at 37.

In operation it will be found that where several drivers operate the same vehicle, each driver having a different foot length from the others, the accelerator will prove too soft or too hard for one or more. With the counterbalancing heelrest applied to both the brake and accelerator units this complaint can be eliminated for both operating feet, since the feet may be moved left or right to change resistance of the pedals.

Figure 2:
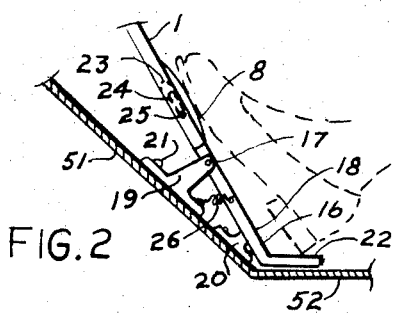
FIGURE 2 is a side elevation of the lower portion of the pendulum suspending arm and pedal, together with the heelrest, as viewed from left to right.

In FIGURE 1 the heels of the driver rest behind the inclined pivot mountings 17 and 18 at the juncture between the horizontal and inclined sections of the heelrests. For greater counterbalancing leverage against the weight of the ball of the feet, as well as to obtain greater ankle comfort, the feet may be drawn rearwardly upon their heelrest shelves, as in FIGURE 2, where a foot is shown withdrawn from the juncture of the sections.

Figure 3:
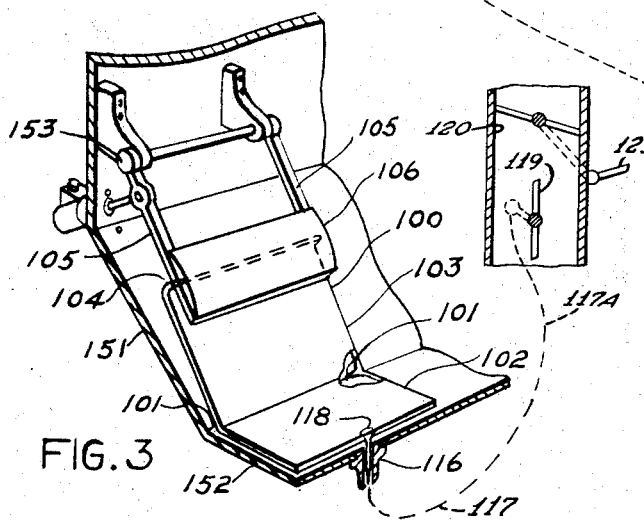
FIGURE 3 is a perspective view of a pendulum suspended arm and pedal, together with an accessory form of the rotatable heelrest, connecting to carburetor and linkage of FIGURE 4.

Referring now to FIGURE 3 there is shown an accessory form of the heelrest. The assembly 100, being a single unit, may be placed on the floorboard section 152 of the driver compartment and under the brake pedal without attachment to the vehicle itself. Here bracket 101 is welded across the angle formed between heelrest shelf 102 and upwardly extending section 103. Bracket 101 bears at or near the forward edge of the horizontal section 152 of the floorboard to rotate the heelrest shelf 102 upwardly and forwardly in an arc perpendicular to 152.

Upwardly extending section 103 of the heelrest rides frictionally at curved end 104 to engage the underside of pendulum suspended arm 105, so that downward weight of the heel or shelf 102 provides a thrust at 104 counter to the direction of brake operation. When pressure is applied by the ball of the foot, the weight of the heel is overcome and is lifted to follow the moving pedal in an arcuate path. End 104 slides toward the lower end of arms 105 as this action occurs. With relief of pressure on the pedal predominant heel weight again applies its force to bring the pedal to release position and move the heel back to its original location.

Figure 4:
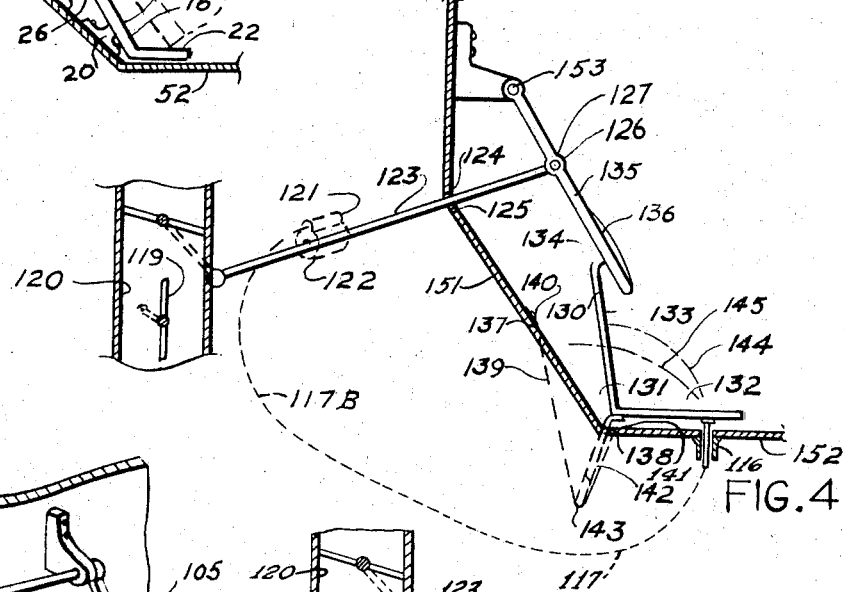
FIGURE 4 is a side elevation of FIGURE 3, showing additionally in broken lines an extension of the heelrest pivots to operate in a socket below the floorboard.

FIGURE 3 also shows a method for cutting the flow of fuel to the motor of the vehicle whenever the brake pedal is applied. Flexible shaft fitting 116 screws into the floorboard section 152 at the rear end of heelrest shelf 102 so that flexible shaft 117, attached to 102 at 118, will move endwardly when 102 rotates upwardly to pull shaft 117A, attached to a secondary throttle 119 in carburetor throat 120, to cut down the flow of fuel therethrough. Referring to FIGURE 4 a pull shaft 117B, is attached to a fluid pressure valve 121 on disconnect unit 122. Unit 122 (shown in broken lines) is carried by throttle rod 123. (Forms of both fuel controlling units are shown in my Patent No. 2,912,081, filed Mar. 26, 1951 and issued Nov. 10, 1959.) A spring, not shown, may be added to cooperate with 117 to return 117B to its inoperative position, as shown in the accompanying view.

In FIGURE 4, there is shown an accelerator structure similar to that of the brake structure in FIGURE 3. The throttle rod 123 passes through floorboard section 151 at cut 124–125 to join by way of connecting bolt 126, the pendulum suspended throttle arm 135 at intermediate point 127. Arm 135 is suspended from fulcrum point 153 to terminate at its lower end in pedal 136. A heelrest assembly 130, duplicating in construction the brake assembly 100 of FIGURE 3, has bracket 131 welded across the angle formed by shelf 132 and upwardly extending section 133, so that bracket 131 bears at or near the forward edge of the horizontal section 152 of the floorboard for rotation of the heelrest shelf upwardly and forwardly, to lift the heel toward the pedal when it is operated. Section 133 rides frictionally at its curved end 134 to bear against the underside of arm 135.

Since accelerators are tilted to the floorboard with regular frequency, the accelerator operating ankle is flexed through a wider arc than the brake operating ankle, this being especially true where the brake is a short-stroke powered brake. To minimize the ankle rotation for the accelerator ankle the forward movement of the heel may be increased by lengthening bracket 131. To accomplish this the floorboard 151–152 is shown to be cut away between 137 and 138. Pocket-shaped gusset (shown in broken lines) is inserted and attached to the floorboard at 140 and 141. Lengthened bracket 142 (shown in broken lines) then pivots at the base of the gusset below the floorboard. Instead of moving through arc 144 the heel then moves through arc 145 with greater forward movement and less rise of the foot, reducing substantially ankle rotation.

Where a brake pedal operates a master cylinder without a power booster the pedal stroke becomes longer, so that lengthening bracket 131 in FIGURE 3 offers added comfort for the braking foot.

In FIGURE 5 is shown another form of heelrest that rotates in a manner similar to the form in FIGURE 4 where bracket 131 is replaced by longer bracket 142, to increase forward heel movement and decrease heel rise, a feature especially desirable where the pedal stroke is deep and the ankle rotation requires follow-up of leg thrust. In this form a heelrest assembly 200 carries shelf 201 one end of which projects upwardly in extension 202. At the juncture of 201 and 202 there is welded apertured stud 203 to receive bolt 204 connecting the assembly with one apertured end of link 205. The lower apertured end of the link connects by way of bolt 206 with bracket 207 at 208. The bracket is mounted on the floorboard by metal screw 209 ahead of the upper end of link 204 and preferably on the inclined section 251 of the floorboard.

Extension 202 terminates at its upper end in a bearing opening 210 to cooperate through bolt 211 with stud 212 on the lower end of pendulum suspended arm 213 carrying pedal 214. In operation, when pedal 214 is depressed by the operator, heelrest assembly 200 is both lifted and rotated forwardly about its pivot bolt 204 to follow the pedal at a rate such that the ball of the operating foot remains in substantially its original pressure applying location. Relief of pressure by the operator allow the predominant weight of the relaxed heel to provide a counter-rotating force about pivot bolt 204 against the brake arm 213 for return of the pedal 214 to release position.

It should be noted that in deep stroke braking, where the heel travels forwardly almost as much as the ball of the foot, the action is somewhat akin to dragging the heel forwardly along the floorboard but with the advantage that the heel is automatically returned to its brake released position and, in addition, that its relaxed weight serves to hold the pedal and the ball of the foot in the released position.

As shown in FIGURE 6 obstruction between the pedal and heelrest may be eliminated by placing the connecting means adjacent to the inclined section of the floorboard under the customary vehicle floor mat or in a slot cut through the mat. The area between the heelrest and pedal then becomes usable as a foot resting spot when the pedal is not in use.

Here pedal 300 on a pendulum suspended arm is shown to operate a clutch, generally designated as 302. A rod 303 is pivotally suspended between the pedal at 304 and the upper end of lever arm 305. Lever arm 305 pivots at 306 on vehicle supported bracket 307 and terminates at its lower end in crank arm 308 for movement of clutch driven member 309 to disengage or reengage 309 with driving member 310. A spring 311 between the upper end 312 of lever arm 305 and bracket 307 urges pedal 300 to its released position and the driven member 309 to engage with the driving member 310.

In this construction a stud 313 at the lower end of arm 301 is apertured to accept bolt 314 on which one end of link 315 swivels. The opposite end of link 315 swivels with one end of link 316 by way of bolt 317. The opposite end of link 317 swivels on bracket 318 through bolt 319 held to the upper end of floorboard section 351 by metal screw 320.

Heelrest assembly 321 is composed of a flat plate 322 welded to a U-shaped frame 323, the latter apertured at its ends to pivot by way of commonly numbered bolts 324 with brackets 325 which are held to the floor by metal screws 326. A rod 327 apertured at its L-shaped ends connects at its lower end with bolt 328 to engage one end of frame 323. Rod 327 connects to swivel at its upper end through bolt 329 on link 316.

The floor mat 330 covering the floorboard is slotted from 331 to 332 and from 333 to 334 to allow mounting of bracket 318 and the mounting of one of the brackets 325 which cooperates with rod 327 located therebetween and under the mat. The opposite end of the brackets 325 which cooperates with rod 327 located therebetween and under the mat. The opposite end of the brackets 325 mounts on the floorboard through a third slot (not shown) in the mat.

In the operation of the mechanism so far described links 315 and 316 in spanning between the released clutch arm 301 and bracket 318 arch upwardly at 317. When the ball of the operator's foot applies pressure to the pedal 300, bolt connection 317 moves upwardly so that links 315 and 316 rotate upwardly in opposite arcuate paths. Rod 327 consequently follows upwardly to lift heelrest assembly 321 and about 324. The operator's heel, likewise, is raised upwardly and forwardly without loss of contact with the heelrest to preserve the contact of the ball of the foot with the pedal at the position of original application of pressure.

For maximum accuracy in the lift action of the heel, and particularly where the rate of upward and forward movement of the heelrest must vary to preserve heel contact, another form of the heelrest is shown in FIGURE 7, wherein a controlling cam pre-measures the rate of lift and forward propulsion, the contouring of the edge of the cam being shaped to accurately maintain the spaced relationship between the operator's heel and the pedal contact position throughout the entire range of the pedal's movement.

The heelrest assembly 400 is composed of heelrest unit 401 pivoting about bolt connector 402 of bracket 403 secured to the floorboard by metal screw 404. The forward end of 400 terminates in arm 405 which has wheel 406 operating on bearing bolt 407. A bracket 408 attached by metal screw 409 to the underside of the inclined section 451 of the floorboard engages through bolt 410 the lower apertured end of cam rod 411. A cam 412 forms a part of the lower end of rod 411 and is located for engagement of its curved edge with wheel 407. The upper end of rod 411 is apertured to receive bolt 413 for swivel engagement with the forward apertured end of connecting rod 414. Rod 414 passes through the floorboard section 451 at opening 415–416 and is apertured at its rearward end to engage stud 417 by way of bolt 418. Stud 417, in turn, is welded to pendulum suspended brake arm 419 carrying pedal 420. A crescent-shaped spring steel return spring 421, to supplement the usual master cylinder return spring, is anchored at one end in the surface of cam 412 and the other end in bracket 408 to urge rod 411 upwardly.

In the operation of this mechanism when pressure is applied at pedal 420, connecting rod 414 rotates cam rod 411 in a counterclockwise direction. Cam 412 then pressures wheel 406 to indirectly rotate heelrest assembly 400 in the same direction to lift the heelrest 400, the cam being shaped in whatever form is required to accurately maintain the ball of the foot and the heel in their initial contacting positions.

The heel rests, may, for example, be usefully applied to piano pedals, organ pedals, drum pedals, lathes, boats and aircraft, and have sundry other possibilities. The locations of the pivotal points of fulcrum for the pedal arms and heelrests, the length of links or the shape of the cam shown are not necessarily accurate, but are meant to delineate the action obtained through their use, and it is the purpose, in each case, to demonstrate that the relaxed weight of the heel is useful in supporting a pedal in its released position.

I claim:

1. In combination with a vehicle having a firewall and floorboard a braking system having an operating treadle section with a heelrest, said treadle section pivoted through stanchions mounted on the floorboard of the vehicle, a separate platform toe section attached to a brake shaft and hinged to the driving compartment firewall on the platform side of said firewall and extending diagonally toward the floorboard so that a portion of said toe section is closed to said floorboard than other oprtions of said toe selection, and an arm attached to said treadle section contacting the underside of said toe section to bear upwardly on said toe section when weight of the driver's relaxed foot pressures said heelrest for support of said toe section, so that with applied pressure said toe section will rotate arcuately in a direction opposite to the direction of said treadle.

2. The device of claim 1 wherein one of said stanchions is located forwardly of the other of said stanchions so that a change of leverage on said platform toe section can be obtained as the operator's foot is shifted laterally along said platform toe section, and said heelrest having a shelf extending rearwardly a sufficient distance so that the operator's foot may be shifted laterally fore and aft to engage the heelrest in a variety of positions.

3. In a vehicle driving compartment having a horizontal section of a floorboard, an inclined section joined thereto and a firewall joined to the upper end of said inclined section, a pendulum suspended control pedal mounted in said compartment on said firewall, a pair of connected links to swivel through connections to said pedal and firewall and in combination longer than the distance between said pedal, when released, and said firewall, a heelrest projecting over said horizontal section of said floorboard and pivoting on a mounting at the juncture of said horizontal and inclined sections, a shaft adjacent said inclined section pivotally connected at its lower end to said heelrest adjacent its mounting, said shaft projecting upwardly to connect pivotally with one of said links at a location adjacent said firewall, so that with operation of said pedal said heelrest will respond upwardly and rotatably by way of said links and shaft.

4. In combination with a pendulum suspended pedal operable by the ball of an operator's foot a substantially horizontal heelrest to carry the heel of said operator's foot, said heelrest pivoted at one edge on a base below said pedal for upward rotation in the direction of pedal operation, an upward projecting arm pivotally mounted adjacent said pivoting edge of said heelrest the upper end of said arm engaging said pedal by way of a link, a cam carried by the lower pivoting end of said arm, an arm projecting from said heelrest to engage said cam, so that with operation of said pedal said heelrest will rotate upwardly at a rate such that the ball of the foot and the heel will remain in their initial contact positions throughout the operation.

5. In a vehicle having a wall, a pendulum suspended pedal pivotally mounted on the pedal side of the wall, a heelrest, means for pivotally supporting said heelrest to said wall, means for connecting said pedal and said heelrest to afford rotation of said heelrest responsive to movement of said pedal, the rate of rotation of said heelrest responsive to movement of said pedal being at a rate such that the toe portions and heel portions of the operator's foot remain at substantially their initial contact locations with said pedal and said heelrest during movement of said pedal and said heelrest, and wherein said vehicle has an engine and a carburetor and a secondary throttle shutter in said carburetor, and means connecting said heelrest to said throttle shutter for movement of said shutter responsive to movement of said heelrest.

6. In a vehicle having a wall, a pendulum suspended pedal pivotally mounted on the pedal side of the wall, a heelrest, means for pivotally supporting said heelrest to said wall, means for connecting said pedal and said heelrest to afford rotation of said heelrest responsive to movement of said pedal, the rate of rotation of said heelrest responsive to movement of said pedal being at a rate such that the toe portions and heel portions of the operator's foot remain at substantially their initial contact locations with said pedal and said heelrest during movement of said pedal and said heelrest, and wherein said vehicle has an engine, a carburetor with a throttle shutter, and means connecting said pedal to said throttle shutter for movement of said shutter responsive to movement of said pedal, said means including a vacuum operated disconnect having an inlet valve, and means connecting said heelrest to said inlet valve to open said valve responsive to movement of said heelrest.

References Cited

UNITED STATES PATENTS

| 1,403,443 | 1/1922 | Paul | 74—564 |
| 2,352,104 | 6/1944 | Kennedy | 192—3 |
| 2,902,123 | 9/1959 | Brugidun | 192—3 |

MILTON KAUFMAN, *Primary Examiner.*

U.S. Cl. X.R.

74—564; 180—90.6; 192—3

UNITED STATES PATENT OFFICE
CERTIFICATE OF CORRECTION

Patent No. 3,426,615                                              February 11, 1969

Raymond C. Strauss

It is certified that error appears in the above identified patent and that said Letters Patent are hereby corrected as shown below:

Column 3, line 11, "Patent 2,912,819" should read -- Patent 2,912,081 --; line 71, "or" should read -- on --. Column 5, line 5, "allow" should read -- allows --; lines 55 and 56, cancel "which cooperates with rod 327 located therebetween and under the mat. The opposite end of the brackets 325"; line 66, cancel "and". Column 6, line 54, "closed" should read -- closer --; same line 54, "oprtions" should read -- portions --; line 55, "selection" should read -- section --.

Signed and sealed this 7th day of April 1970.

(SEAL)
Attest:

Edward M. Fletcher, Jr.                                  WILLIAM E. SCHUYLER, JR.
Attesting Officer                                                Commissioner of Patents